US012558823B2

(12) United States Patent
Chi et al.

(10) Patent No.: US 12,558,823 B2
(45) Date of Patent: Feb. 24, 2026

(54) POUCH-SHAPED BATTERY CASE SHAPING APPARATUS USING ELECTROMAGNETIC FIELD AND POUCH-SHAPED BATTERY CASE SHAPING METHOD USING THE SAME

(71) Applicant: LG Energy Solution, Ltd., Seoul (KR)

(72) Inventors: Ho June Chi, Daejeon (KR); Hang June Choi, Daejeon (KR); Jeong Oh Moon, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 323 days.

(21) Appl. No.: 17/925,095

(22) PCT Filed: Oct. 13, 2021

(86) PCT No.: PCT/KR2021/014087
§ 371 (c)(1),
(2) Date: Nov. 14, 2022

(87) PCT Pub. No.: WO2022/086032
PCT Pub. Date: Apr. 28, 2022

(65) Prior Publication Data
US 2023/0347555 A1    Nov. 2, 2023

(30) Foreign Application Priority Data
Oct. 21, 2020    (KR) ........................ 10-2020-0136880

(51) Int. Cl.
B29C 43/36        (2006.01)
B29C 43/56        (2006.01)
(Continued)

(52) U.S. Cl.
CPC .............. B29C 43/36 (2013.01); B29C 43/56 (2013.01); H01M 50/105 (2021.01);
(Continued)

(58) Field of Classification Search
CPC ....... B29C 2043/3602; B29C 2043/458; B29L 2031/7146
See application file for complete search history.

(56) References Cited

U.S. PATENT DOCUMENTS

| | | |
|---|---|---|
| 2019/0051868 A1 | 2/2019 | Lee et al. |
| 2020/0083493 A1 | 3/2020 | Lee |
| 2020/0406528 A1 | 12/2020 | Jung et al. |

FOREIGN PATENT DOCUMENTS

| | | |
|---|---|---|
| CN | 107138591 A | 9/2017 |
| JP | H01122624 A | 5/1989 |

(Continued)

OTHER PUBLICATIONS

International Search Report for PCT/KR2021/014087 mailed Jan. 20, 2022. 4 pgs.

(Continued)

*Primary Examiner* — Christina A Johnson
*Assistant Examiner* — Xue H Liu
(74) *Attorney, Agent, or Firm* — Lerner David LLP

(57)    ABSTRACT

A shaping apparatus for a pouch-shaped battery case includes a punch configured to press a laminate sheet in order to shape an electrode assembly receiving portion of the pouch-shaped battery case, a die in which an accommodation portion is formed having a size corresponding to the electrode assembly receiving portion, a holder configured to fix an outer periphery of the laminate sheet, and an electromagnetic field-generating means attached to the punch and configured to generate an electromagnetic field. A pouch-shaped battery case shaping process uses the shaping apparatus to manufacture the pouch-shaped battery case.

13 Claims, 7 Drawing Sheets

(51) Int. Cl.
*H01M 50/105* (2021.01)
*H01M 50/124* (2021.01)
*B29L 31/00* (2006.01)

(52) U.S. Cl.
CPC ... *H01M 50/124* (2021.01); *B29C 2043/3602*
(2013.01); *B29C 2043/568* (2013.01); *B29L*
*2031/7146* (2013.01)

(56) References Cited

FOREIGN PATENT DOCUMENTS

| | | | |
|---|---|---|---|
| JP | 2000133216 | A | 5/2000 |
| KR | 20120032968 | A | 4/2012 |
| KR | 20120074969 | A | 7/2012 |
| KR | 101282753 | B1 | 7/2013 |
| KR | 101458345 | B1 | 11/2014 |
| KR | 20150089556 | A | 8/2015 |
| KR | 20150095387 | A | 8/2015 |
| KR | 20170074251 | A | 6/2017 |
| KR | 20170124882 | A | 11/2017 |
| KR | 20180012567 | A | 2/2018 |
| KR | 101837234 | B1 | 3/2018 |
| KR | 20180028194 | A | 3/2018 |
| KR | 20180092174 | A | 8/2018 |
| KR | 20190030423 | A | 3/2019 |
| KR | 20190092017 | A | 8/2019 |
| KR | 20190098581 | A | 8/2019 |

OTHER PUBLICATIONS

Extended European Search Report including Written Opinion for
Application No. 21883103.0 dated Nov. 8, 2023, pp. 1-10.

10

100

200

220

POUCH-SHAPED BATTERY CASE SHAPING
APPARATUS USING ELECTROMAGNETIC
FIELD AND POUCH-SHAPED BATTERY
CASE SHAPING METHOD USING THE
SAME

CROSS-REFERENCE TO RELATED
APPLICATIONS

The present application is a national phase entry under 35
U.S.C. § 371 of International Application No. PCT/KR2021/
014087 filed on Oct. 13, 2021, and now published as
International Publication No. WO 2022/086032 A1, which
claims priority from Korean Patent Application No.
10-2020-0136880 filed on Oct. 21, 2020, all of which are
hereby incorporated herein by reference in their entireties.

FIELD

The present invention relates to a pouch-shaped battery
case shaping apparatus using an electromagnetic field and a
pouch-shaped battery case shaping method using the same.
More particularly, the present invention relates to a pouch-
shaped battery case shaping apparatus using an electromag-
netic field including a punch configured to shape a laminate
sheet that is used as a pouch-shaped battery case into a
rectangular parallelepiped shape, wherein an electromag-
netic field is generated in the laminate sheet in order to
minimize damage to the surface of the laminate sheet, and
a pouch-shaped battery case shaping method using the same.

BACKGROUND

Demand for a secondary battery as an energy source for
mobile devices and electric vehicles has abruptly increased.
In particular, demand for a lithium secondary battery, which
has high energy density and discharge voltage, is very high.

Based on the shape thereof, the lithium secondary battery
may be classified as a cylindrical battery, a prismatic battery,
or a pouch-shaped battery. The pouch-shaped battery has
advantages in that the pouch-shaped battery can be stacked
with high integrity, has high energy density per unit weight,
is inexpensive, and is easily deformable. The pouch-shaped
battery uses a laminate sheet as a battery case and is
configured to have a structure in which an electrode assem-
bly is received in a receiving portion formed in the laminate
sheet together with an electrolytic solution.

The receiving portion of the pouch-shaped battery is
formed by pressing a ductile laminate sheet through deep
drawing using a punch in the state in which the sheet is fixed.
During pressing using the punch, defects, such as pin-holes
or cracks, are formed on the outer surface of the laminate
sheet due to the force of friction between the punch and the
laminate sheet as the result of contact therebetween and
limited ductility of the laminate sheet. As deep drawing
progresses, frictional force at the edge distal end of the
punch is exponentially increased, whereby defects are fre-
quently formed in the laminate sheet that contacts the edge
distal end of the punch. For this reason, it is not possible to
greatly reduce the thickness of the laminate sheet, which is
used as a battery case, which acts as a limitation in increas-
ing the capacity of the battery per unit volume.

In order to solve the above problem, various attempts,
including disposing a heater in a pressing punch, including
an electromagnetic force generation unit, or providing a
punch head made of a low coefficient of friction material,
have been made.

Patent Document 1 relates to a shaping method for
securing a pouch residual rate for secondary batteries,
wherein a shaping die is disposed at the upper side, a
pressing punch is disposed at the lower side, a pouch
shaping metal is disposed between the shaping die and the
pressing punch, a holder or a roller is located at a lateral inlet
of each of the shaping die and the pressing punch, and a
heater is disposed in the shaping die, the pressing punch, and
the holder, or the roller.

In Patent Document 1, when the pouch shaping metal is
shaped, corner portions of the pouch shaping metal are
heated by the heater to increase the residual rate and
flexibility of the pouch shaping metal, whereby it is possible
to prevent cracks from being formed at lower end corners of
an electrode assembly receiving portion.

Patent Document 2 relates to a pouch shaping apparatus
having the following construction. The pouch shaping appa-
ratus includes a die having formed therein a shaping space
inwardly depressed from the upper surface thereof, a first
corner forming an opening of the shaping space being
filleted so as to have a first radius of curvature; a holder
disposed above the die, when a pouch film is seated on the
upper surface of the die, the holder moving downwards to fix
the pouch film while the holder is in contact with the die in
the state in which the pouch film is interposed between the
die and the holder; and an electromagnetic force generation
unit disposed above the shaping space, the electromagnetic
force generation unit being configured to generate electro-
magnetic force and to apply the generated electromagnetic
force to the shaping space.

In Patent Document 2, the electromagnetic force genera-
tion unit, which is disposed above the shaping space, gen-
erates electromagnetic force and applies the generated elec-
tromagnetic force toward the shaping space. A cup portion
is brought into tight contact with the pouch film along the
shaping space by the electromagnetic force (repulsive force;
Lorentz force), whereby the pouch film is drawn.

Patent Document 3 relates to a battery case shaping
apparatus including a die, a punch, and a holder. In Patent
Document 3, a punch head having a lower coefficient of
friction of 0.04 to 0.2 than a conventional punch is provided
in order to prevent cracks from being formed in a sheet type
base material due to deep drawing of the punch.

Patent Documents 1 to 3 disclose a construction for
preventing the occurrence of cracks but do not disclose a
construction of providing an electromagnetic field in order
to reduce the force of friction between a punch and a
laminate sheet according to the present invention.

PRIOR ART DOCUMENTS (Patent Document 1) Korean Patent Application Publica-
tion No. 2018-0092174 (2018 Aug. 17)
(Patent Document 2) Korean Patent Application Publica-
tion No. 2019-0098581 (2019 Aug. 22)
(Patent Document 3) Korean Patent Application Publica-
tion No. 2018-0028194 (2018 Mar. 16)

SUMMARY OF THE DISCLOSURE

The present invention has been made in view of the above
problems, and it is an object of the present invention to
provide a pouch-shaped battery case shaping apparatus
using an electromagnetic field capable of reducing friction
between a punch and a laminate sheet when shaping a pouch-shaped battery case, thereby preventing damage to the laminate sheet, and a pouch-shaped battery case shaping method using the same.

It is another object of the present invention to provide a pouch-shaped battery case shaping method capable of improving shapeability of a laminate sheet.

It is a further object of the present invention to provide a pouch-shaped battery case shaping method capable of increasing energy density.

In order to accomplish the above objects, the present invention provides a pouch-shaped battery case shaping apparatus including a punch configured to press a laminate sheet in order to shape a pouch-shaped battery case; a die having formed therein an accommodation portion having a size corresponding to an electrode assembly receiving portion that is shaped by the punch; and a holder configured to fix the outer periphery of the laminate sheet, wherein a means configured to generate an electromagnetic field is added to the punch.

In the pouch-shaped battery case shaping apparatus according to the present invention, the means configured to generate the electromagnetic field may be a punch coil formed as the result of an electric wire being wound.

In the pouch-shaped battery case shaping apparatus according to the present invention, the surface of the punch configured to press the laminate sheet may extend and protrude from the center thereof in an outward direction.

In the pouch-shaped battery case shaping apparatus according to the present invention, the sectional shape of the extending and protruding portion may form an acute angle.

In the pouch-shaped battery case shaping apparatus according to the present invention, the acute corner portion may be rounded.

In the pouch-shaped battery case shaping apparatus according to the present invention, a punch coil formed as the result of an electric wire being wound may be added adjacent to the extending and protruding portion.

The present invention provides a pouch-shaped battery case shaping method including S1) disposing a laminate sheet on a die; S2) fixing the laminate sheet to the die using a holder; and S3) pressing the laminate sheet using a punch having a means configured to generate an electromagnetic field added thereto.

In the pouch-shaped battery case shaping method according to the present invention, the means configured to generate the electromagnetic field may be operated when the punch presses the laminate sheet.

In the pouch-shaped battery case shaping method according to the present invention, a metal layer of the laminate sheet and/or the punch may be vibrated by an electromagnetic field generated as the result of supplying an alternating current to the means configured to generate the electromagnetic field.

In the pouch-shaped battery case shaping method according to the present invention, the step S3) may be replaced by S3-1) a preliminary shaping step of pressing the laminate sheet up to a portion of the depth of a depressed portion of the die using the punch; and S3-2) a step of generating vibration of the metal layer of the laminate sheet using an electromagnetic field generated by supplying alternating current to the means configured to generate the electromagnetic field of the punch in a state of being inserted into the depressed portion.

In addition, the pouch-shaped battery case shaping method according to the present invention may further include applying single current and high current pulses to the means configured to generate the electromagnetic field to generate a strong electromagnetic impact.

In addition, the present invention provides a pouch-shaped battery case manufactured by the pouch-shaped battery case shaping method.

In addition, the present invention provides a secondary battery including the pouch-shaped battery case.

In the present invention, one or more constructions that do not conflict with each other may be selected and combined from among the above constructions.

The present invention has been made in view of the above problems and has an effect in that, when a pouch-shaped battery case is shaped, a laminate sheet is vibrated by an electromagnetic field applied to a punch, whereby the force of friction between the punch and the laminate sheet is reduced, whereby damage to the laminate sheet is prevented.

The present invention has an effect in that an electromagnetic field is formed at a punch protrusion formed at the edge of the pressing surface of the punch of the pouch-shaped battery case shaping apparatus in order to shape the laminate sheet, whereby shapeability of corner portions of an electrode assembly receiving portion of the pouch-shaped battery case is improved.

In addition, the present invention has an effect in that the capacity of the receiving portion is increased while energy density is improved as the result of improvement in shapeability of the pouch-shaped battery case.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, embodiments of the present invention will be described with reference to the accompanying drawings.

Figure 1:
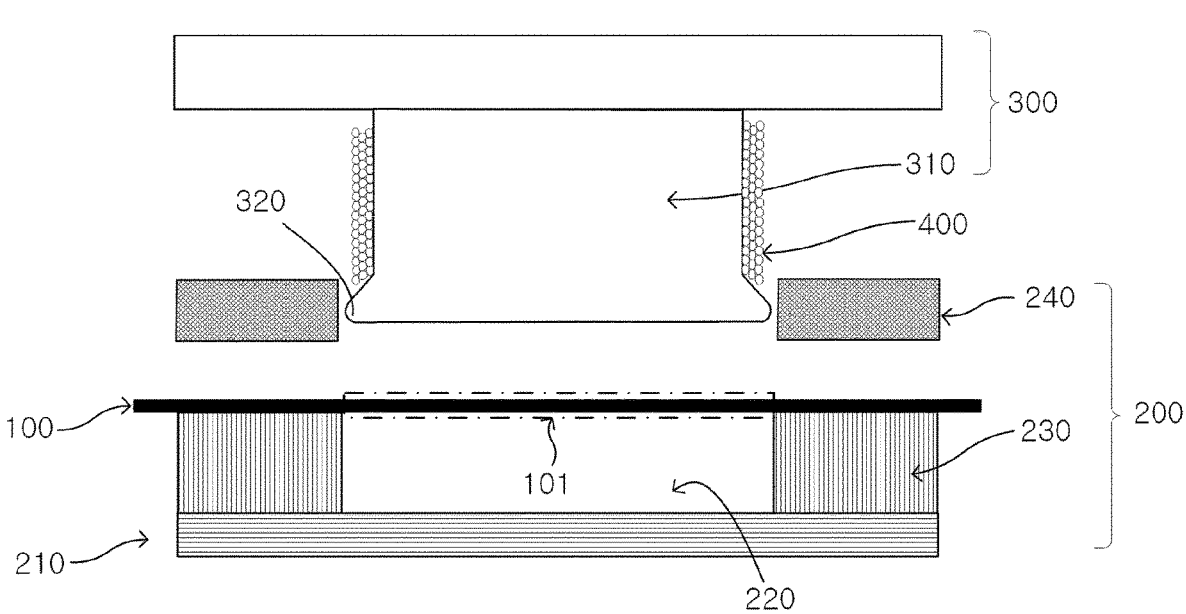
FIG. 1 is a schematic cross-sectional elevation view of a shaping apparatus for a pouch-shaped battery case according to a first embodiment.

FIG. 1 is a schematic cross-sectional elevation view of a pouch-shaped battery case shaping apparatus 10 according to a first embodiment of the present invention.

Referring to FIG. 1, the shaping apparatus 10 according to the first embodiment of the present invention, which is an apparatus for shaping a laminate sheet 100 to form a receiving portion configured to receive an electrode assembly, includes a die assembly 200 and a punch 300.

The die assembly 200, which is a construction for fixing an outer circumferential portion of the laminate sheet 100 adjacent to a portion to be shaped 101 of the laminate sheet 100 in place, includes a die 210, which includes a depressed portion 220 formed in a shape corresponding to the receiving portion and an outer circumferential wall 230 located at opposite sides of the depressed portion 220 when viewed in plan, the laminate sheet 100 being mounted to the upper end of the outer circumferential wall 230, and a holder 240 located at a position corresponding to the upper side of the outer circumferential wall 230, the holder being configured to press the outer circumferential portion of the laminate sheet 100 downwards so as to be fixed in place.

The punch 300 is a construction for pressing the portion to be shaped 101 of the laminate sheet 100 fixed in place by the die assembly 200 to shape the laminate sheet 100 by deep drawing in order to form the receiving portion. Although a punch head 310 is sometimes called a punch, a portion corresponding thereto is called a punch head 310 and the entirety including the same is called a punch 300 in the present invention.

The surface of the punch head 310 configured to press the portion of the laminate sheet that faces the depressed portion 220 has a protrusion that extends and protrudes from the center thereof in an outward direction. The protrusion is called a punch protrusion 320.

The lower surface (reference numeral not shown) of the punch protrusion 320 formed as the result of extension of the pressing surface of the punch head 310 and the upper surface (reference numeral not shown) of the punch protrusion that abuts the outer circumferential surface of the punch head 310 while forming a predetermined angle together with the lower surface are coupled to each other at the edge of the lower end of the punch head 310, whereby the punch protrusion 320 is formed. The upper surface and the lower surface of the punch protrusion 320 may form an acute angle.

Although each corner portion of the punch protrusion 320 may be formed in an angled wedge shape, it is preferable for the corner portion of the punch protrusion to be formed in a round shape. When the corner portion of the punch protrusion 320 is round, the force of relative friction between the corner portion of the punch protrusion 320 and the laminate sheet 100 during a drawing process may be reduced, which is advantageous in preventing damage to the laminate sheet.

In addition, the punch protrusion 320 and the punch head 310 may be separately manufactured and may then be coupled to each other by welding or may be integrally manufactured.

An electric wire is wound around the outer circumferential surface of the punch head 310 to form a punch coil 400. When alternating current is supplied to the punch coil 400, an electromagnetic field is formed at the end of the punch 300. In particular, a relatively high electromagnetic field is formed at the corner of the punch protrusion 320. In addition, magnetic flux in the punch coil 400 is changed, and induced power is generated at the laminate sheet 100 disposed adjacent thereto, whereby an electromagnetic field is induced. The electromagnetic field of the punch and the induced electromagnetic field of the laminate sheet that face each other interact with each other, and microscopic vibration is generated by the frequency of the alternating current. In particular, relatively high microscopic vibration is formed at the corner portion of the punch protrusion 320. Friction between the punch and the laminate sheet may be reduced by the vibration. When single current and high current pulses are applied to the punch coil 400, a stronger electromagnetic field may be formed, whereby stronger vibration may be generated.

In addition, a strong electromagnetic field is formed at the corner portion of the punch protrusion 320, whereby stronger induced power is generated at the laminate sheet that faces the punch protrusion, and therefore strong Lorentz force is rapidly applied thereto. Consequently, accurate shaping may be performed while preventing damage to the laminate sheet at the corner portion of the punch protrusion.

The punch coil 400 may be provided around the entirety or a portion of the outer circumferential surface of the punch head 310, preferably the upper part of the punch head 310 based on the punch protrusion 320. In the case in which the punch coil is located closer to the punch protrusion 320, an electromagnetic field is more effectively applied to the laminate sheet, which is advantageous in preventing damage to the laminate sheet and improving shapeability.

The laminate sheet 100 is located between the stationary die 210 and the holder 240. More specifically, the outer circumferential portion of the laminate sheet 100 excluding the portion to be shaped 101 is mounted to the upper end of the outer circumferential wall 230 of the stationary die 210, and the holder 240 is located at an upper side corresponding thereto.

For example, the laminate sheet 100 according to the present invention may be configured to have a structure in which a first resin layer having thermal fusibility, a metal layer having material blocking properties, and a second resin layer, which is an outer layer, are stacked or a structure in which a resin layer having thermal fusibility and a metal layer having material blocking properties are stacked.

In order to inhibit penetration of an electrolytic solution, the first resin layer having thermal fusibility may be made of a material that has low hygroscopicity and that is neither expanded nor eroded by the electrolytic solution, such as a polyolefin-based resin.

The metal layer having material blocking properties may be made of, for example, aluminum, an aluminum alloy, or stainless steel in order to increase strength of the battery case in addition to a function of preventing introduction or leakage of foreign matter, such as gas or moisture.

The second resin layer, which is a polymer resin layer forming the outer layer of the battery case, requires predetermined tensile strength and weather resistance such that the second resin layer has excellent resistance to an external environment. Consequently, the second resin layer may be made of, for example, polyethylene terephthalate (PET) or oriented nylon.

The portion of the punch head 310 that abuts the laminate sheet 100 may be made of at least a low coefficient of friction material. The low coefficient of friction material may be any one selected from the group consisting of polyether ether ketone (PEEK), polyethylene terephthalate (PET), polyimide (PI), polyphenylene sulfide (PPS), polypropylene (PP), polyethylene (PE), and nylon.

FIGS. 2 to 6 are schematic cross-sectional elevation views showing a series of processes of manufacturing a pouch-shaped battery case according to a first embodiment of the present invention.

Figure 2:
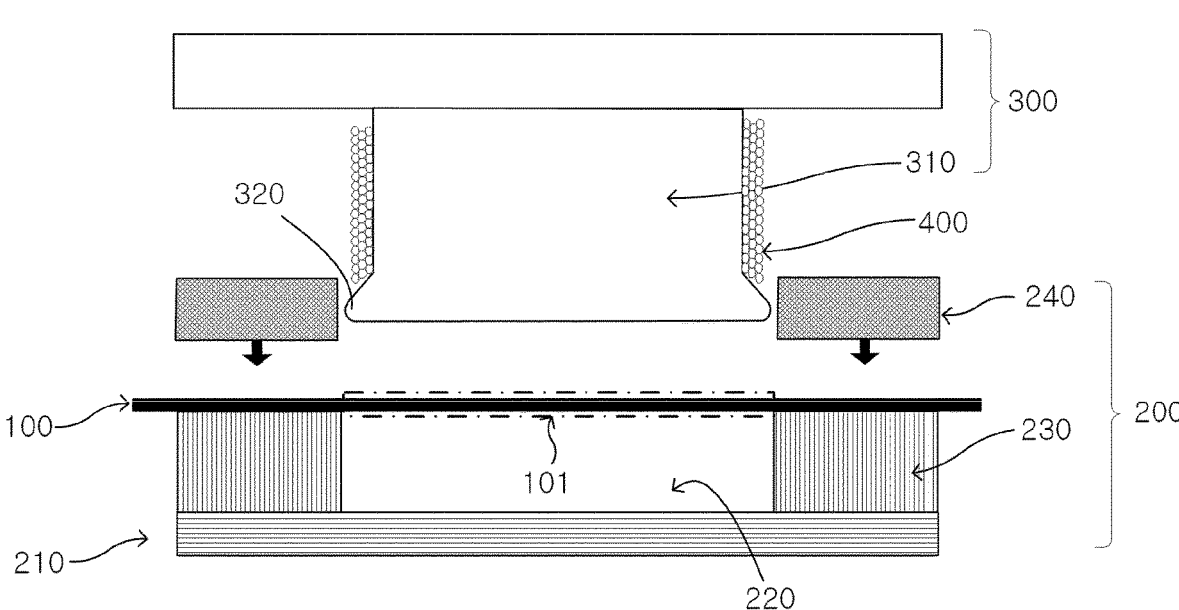
FIGS. 2 to 6 are schematic cross-sectional elevation views showing a series of processes of manufacturing a pouch-shaped battery case according to the first embodiment.

Referring to FIG. 2, the lower surface of a laminate sheet 100 is fixed at the die assembly 200, and the punch 300, which is configured to press a portion to be shaped 101 of the laminate sheet 100, is located above the laminate sheet 100.

Figure 3:
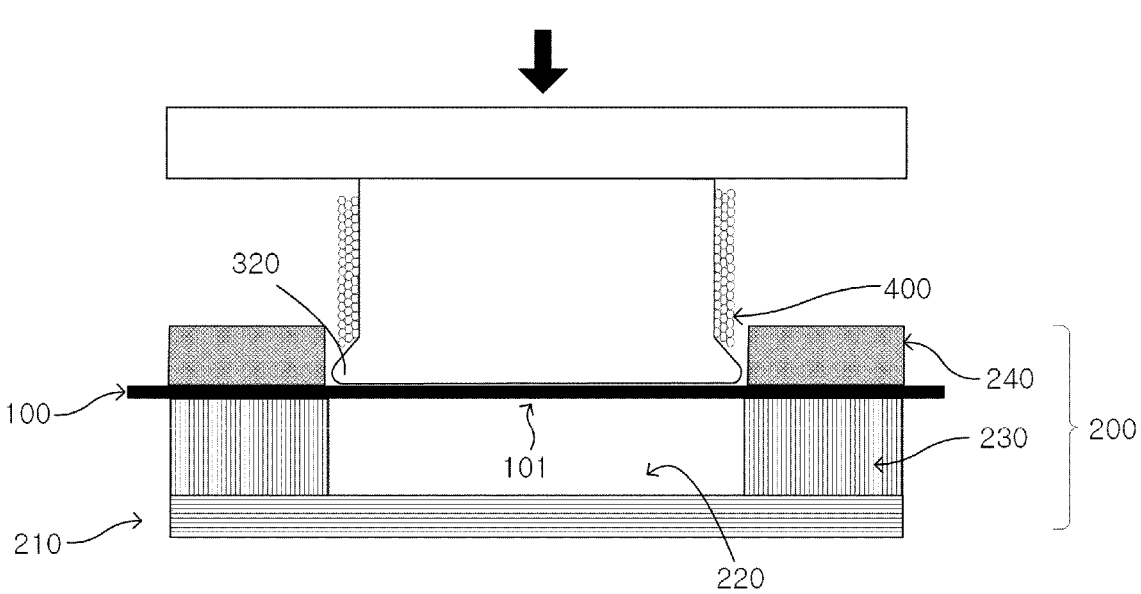

Referring to FIGS. 1 to 3, the upper surface of the laminate sheet 100 is pressed by the holder 240 so as to be fixed in place in the state in which the lower surface of the laminate sheet 100 is mounted at the upper end of the outer circumferential wall 230 of the stationary die 210. After the laminate sheet 100 is fixed in place by the die assembly 200, a deep drawing process for forming a receiving portion is performed.

Referring to FIG. 3, the state in which the punch 300 abuts the upper surface of the laminate sheet 100 before the laminate sheet 100 is shaped to form the receiving portion is shown. The punch 300 is straightly moved in a direction indicated by an arrow in a state of being located above the laminate sheet 100, whereby the lower end surface of the punch abuts the upper surface of the portion to be shaped 101.

Figure 4:
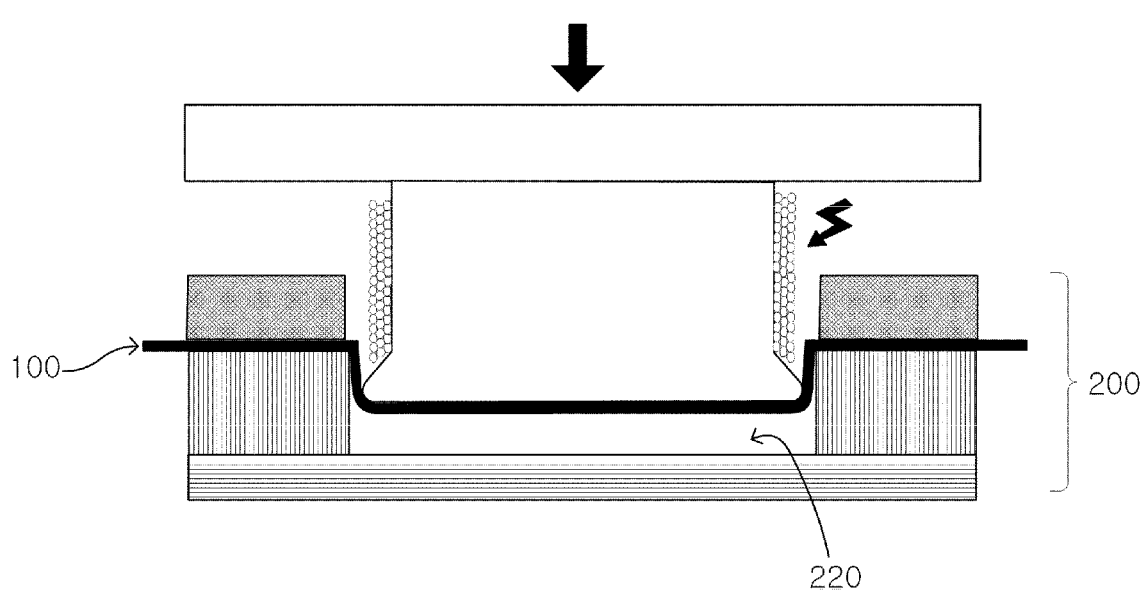

Referring to FIG. 4, a process of pressing the portion to be shaped 101 of the laminate sheet 100 using the punch to shape the laminate sheet 100 such that the receiving portion is formed in the laminate sheet is schematically shown.

This process is a process that is successively performed in the state in which the punch 300 abuts the laminate sheet 100, wherein the punch is straightly moved in a direction indicated by an arrow to press the laminate sheet 100, whereby the laminate sheet 100 that faces the pressing surface of the punch 300 is located in the depressed portion 220.

Here, when the laminate sheet 100 that faces the pressing surface of the punch 300 is pressed up to a predetermined position in the depressed portion 220, alternating current is supplied to the punch coil 400, and the punch 300 continues to press the laminate sheet 100.

In the early stage of pressing, the angle at which the laminate sheet 100 is stretched is small, whereby the force of friction between the punch 300 and the laminate sheet 100 is also small. Consequently, it is preferable to supply current to the punch coil 400 after shaping is performed to some extent. When the laminate sheet 100 that faces the pressing surface of the punch 300 is located at a depth equivalent to 40% to 70% of the entire depth of the depressed portion 220 from the upper end of the outer circumferential wall 230, alternating current is supplied to the punch coil 400, which is also advantageous in reducing power consumption.

Figure 5:
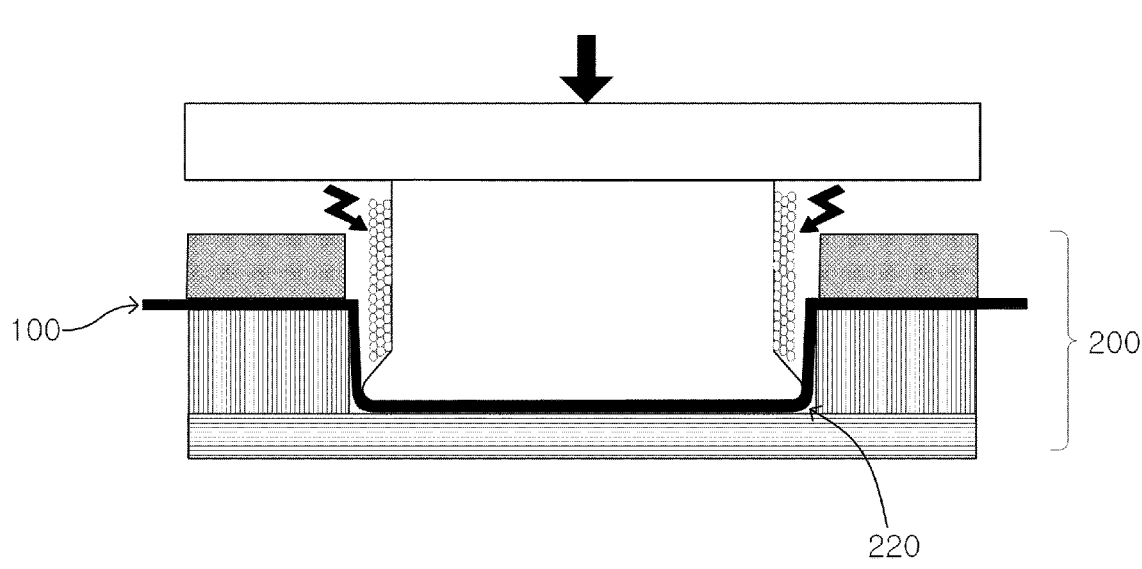
Figure 6:
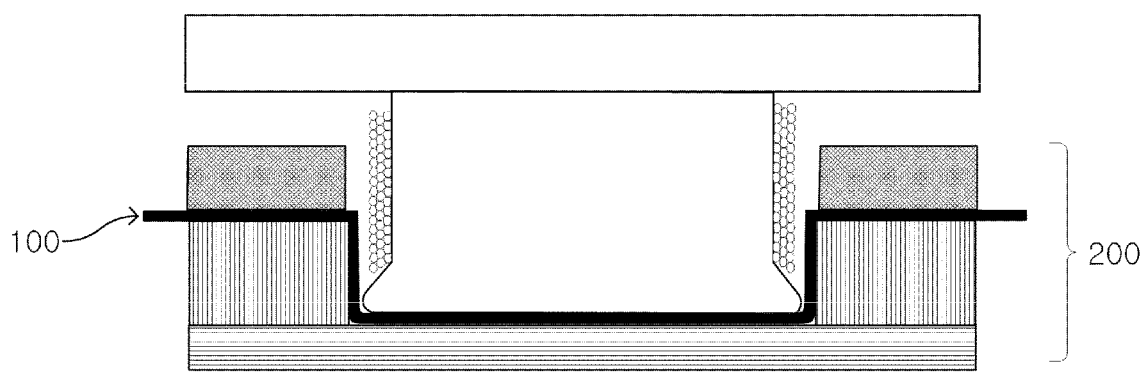

Referring to FIGS. 5 and 6, a process of applying single current and high current pulses to the punch coil 400 to shape the corner portion of an electrode assembly receiving portion of the laminate sheet 100 formed in the depressed portion 220 at high speed is schematically shown.

When the pressing surface of the punch 300 and the laminate sheet 100 that faces the pressing surface are brought into tight contact with the inner surface of the bottom of the depressed portion 220, single current and high current pulses are applied to form a strong electromagnetic field, whereby the receiving portion is shaped while the radius of curvature of the corner portion of the receiving portion that faces the punch protrusion 320 is reduced.

The shaping process may be performed using a method of attaching a film member for shaping to the upper surface of the laminate sheet, shaping the battery case, and separating the film member for shaping.

The film member for shaping may include a substrate film and an adhesive layer formed on one surface of the substrate film so as to be separably attached to the laminate sheet. The substrate film may be a polymer resin film, a metal film, or a composite film thereof. The film member for shaping may have a single-layer structure including a substrate film and an adhesive layer or a multilayer structure in which two or more substrate films and two or more adhesive layers are alternately stacked. The polymer resin film may include at least one selected from the group consisting of polyethylene terephthalate (PET), polyimide (PI), polyphenylene sulfide (PPS), polypropylene (PP), polyethylene (PE), and nylon. The film member for shaping may have a quadrangular shape having a size capable of covering a portion to be shaped by deep drawing when viewed in plan.

Figure 7:
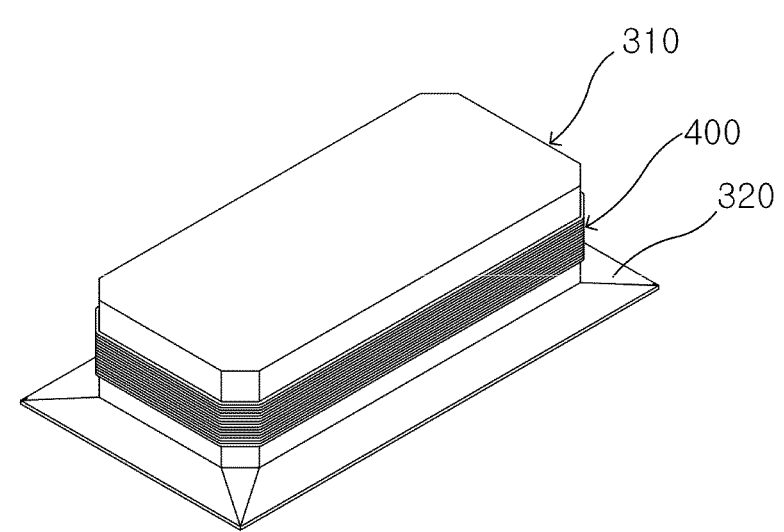
FIG. 7 is a perspective view showing a portion of a punch according to a second embodiment.

FIG. 7 is a perspective view showing a portion of a punch according to a second embodiment of the present invention.

The second embodiment of the present invention is identical to the first embodiment described with reference to FIGS. 1 to 6 except that corners of the punch protrusion 320 are angled, rather than round.

The pouch-shaped battery case according to the present invention described above may be used for secondary batteries.

Those skilled in the art to which the present invention pertains will appreciate that various applications and modifications are possible within the category of the present invention based on the above description.

DESCRIPTION OF REFERENCE NUMERALS

10: Pouch-shaped battery case shaping apparatus according to first embodiment of present invention
100: Laminate sheet
101: Portion to be shaped
200: Die assembly
210: Die
220: Depressed portion
230: Outer circumferential wall
240: Holder
300: Punch
310: Punch head
320: Punch protrusion
400: Punch coil The present invention relates to a pouch-shaped battery case shaping apparatus including a punch configured to press a laminate sheet in order to shape a pouch-shaped battery case, a die having formed therein an accommodation portion having a size corresponding to an electrode assembly receiving portion that is shaped by the punch, and a holder configured to fix the outer periphery of the laminate sheet, wherein a means configured to generate an electromagnetic field is added to the punch, and a pouch-shaped battery case shaping method using the same. Consequently, the present invention has industrial applicability.

The invention claimed is:

1. A shaping apparatus for shaping a pouch-shaped battery case, the apparatus comprising:

a punch configured to press a laminate sheet in order to shape an electrode assembly receiving portion of the pouch-shaped battery case;

a die in which an accommodation portion is formed, the accommodation portion having a size corresponding to the electrode assembly receiving portion;

a holder configured to fix an outer periphery of the laminate sheet; and an electromagnetic field-generating means attached to the punch and configured to generate an electromagnetic field, wherein a punch protrusion of the punch defines a contact surface configured to press the laminate sheet and extends and protrudes outwardly from a center of the punch, wherein the electromagnetic field-generating means is spaced apart from the contact surface of the punch protrusion.

2. The shaping apparatus according to claim 1, wherein the electromagnetic field-generating means is a coiled electric wire wound around the punch.

3. The shaping apparatus according to claim 1, wherein a cross-section of side and bottom surfaces of the punch protrusion defines an acute angle.

4. The shaping apparatus according to claim 3, wherein the punch protrusion is rounded where the side and the bottom surfaces meet.

5. The shaping apparatus according to claim 1, wherein the electromagnetic field-generating means is a coiled electric wire wound around the punch at a location adjacent to the punch protrusion.

6. A pouch-shaped battery case shaping method using the shaping apparatus according to claim 1, the pouch-shaped battery case shaping method comprising:

S1) disposing the laminate sheet on the die;

S2) fixing the laminate sheet to the die using the holder;

S3) pressing the laminate sheet using the punch; and

S4) generating an electromagnetic field with the electromagnetic field-generating means.

7. The pouch-shaped battery case shaping method according to claim 6, wherein the electromagnetic field-generating means generates the electromagnetic field when the punch presses the laminate sheet.

8. The pouch-shaped battery case shaping method according to claim 7, further comprising vibrating a metal layer of the laminate sheet and the punch by the electromagnetic field, wherein the electromagnetic field is generated as a result of an alternating current supplied to the electromagnetic field-generating means.

9. The pouch-shaped battery case shaping method according to claim 6, wherein the step S3) includes pressing the laminate sheet to less than a full depth of a depressed portion of the die using the punch; and wherein the step S4) includes generating vibration of a metal layer of the laminate sheet using the generated electromagnetic field by supplying alternating current to the electromagnetic field-generating means in a state of the punch being inserted into the depressed portion.

10. The pouch-shaped battery case shaping method according to claim 6, further comprising applying single current pulses to the electromagnetic field-generating means.

11. The pouch-shaped battery case shaping method according to claim 9, wherein the depth to which the laminate sheet is pressed in step S3) is a predetermined position, and wherein the alternating current is supplied to the electromagnetic field-generating means when the laminate sheet is pressed to the predetermined position.

12. The pouch-shaped battery case shaping method according to claim 11, wherein the electromagnetic field-generating means is a coiled electric wire.

13. The pouch-shaped battery case shaping method of claim 6, wherein the electromagnetic field-generating means is a coiled electric wire.

* * * * *